UNITED STATES PATENT OFFICE.

J. HOWELL MEARS, OF PHILADELPHIA, PENNSYLVANIA.

CHLORINATING ORES.

SPECIFICATION forming part of Reissued Letters Patent No. 9,202, dated May 18, 1880.

Original No. 195,381, dated September 18, 1877; Reissue No. 8,859, dated August 19, 1879. Application for reissue filed March 16, 1889.

*To all whom it may concern:*

Be it known that I, J. HOWELL MEARS, M. D., of the city and county of Philadelphia, and State of Pennsylvania, have invented a new and useful Improvement in Processes of Chlorinating Ores, which improvement is fully set forth in the following specification.

My invention consists in a process of chlorinating ores by charging them with chlorine under a pressure greater than that of the atmosphere, so that a concentrated solution of chlorine is obtained, and is made to act upon the ore with superior efficiency as compared with the old method of charging under atmospheric pressure only; secondly, in the said process when the super-atmospheric pressure is produced by the evolution of chlorine gas within a closed chamber containing the ore; and, thirdly, the first-named process when the contents of the vessel are kept in agitation during the process of chlorination.

I have found the following mode of proceeding well adapted to the successful practicing of my invention: The ore is properly roasted and pulverized, (the finer the better,) and introduced into a tank with about one-half its weight of water, into which is slaked a proper proportion of lime, (ordinary lime of commerce,) the whole then being thoroughly incorporated by rotating the tank. Chlorine gas is now introduced into the mass, and the tank kept in motion until no more gas will be absorbed, which can be determined by a suitable device for the purpose. The rotation of the tank is then discontinued, dilute sulphuric acid is added to the mixture, and the tank is again rotated for from half an hour to three hours, according to the grade of the ore, when the chlorination is complete. Continuous rotation during the chlorination has the effect of expediting and facilitating the chemical reactions involved.

The large proportion of water above mentioned as put into the tank with the ore gives, in addition to the moisture necessary for the chlorinating operation, a body of water which, after the chlorination is complete, will carry off the contents of the tank conveniently.

By the above-described mode of proceeding I am enabled to obtain a large volume of chlorine, which is condensed in the lime by absorption, and is there held in store, as it were, until the proper time, when it is liberated by the action of the sulphuric acid, and such super-atmospheric pressure is produced by the evolution of chlorine gas as allows the concentration of the solution of chlorine and charges it thoroughly into the pores of the ore.

At the close of the operation which I have above described there is a large excess of chlorine under pressure, produced by the chlorine gas being evolved by the sulphuric acid from the lime, sulphate of lime having been formed and chlorine thrown off. The tank is now tapped, and the excess of chlorine is conducted into a second tank or vessel similar to the first tank or vessel, and also containing a charge of ore ready to be treated; or, if this is not desired, it may be collected in any suitable receptacle. The free chlorine remaining in the tank having been expelled in any usual and suitable manner, the tank is now turned, opened, and emptied into a proper vessel, and the metallic chlorides are afterward collected in the usual manner.

The tank or vessel that I employ is so constructed that when charged with ore, &c., it will be about two-thirds full, and of sufficient strength to endure a pressure of forty to fifty pounds to the square inch. The shaft on which the tank revolves is hollow, so that the chlorine gas may be admitted into the tank while the latter is in motion. The inner face of the tank is provided with cleats secured thereto at intervals, so as to facilitate the stirring or agitation of the mass, and with an apartment or receptacle for sulphuric acid located near the top or vent of the tank, whereby when the latter is turned it will empty the contents of the apartment or receptacle into the mass of ore.

The chief advantages of the use of my invention are the much increased rapidity and thoroughness of the chlorination as compared with any previous process known to me.

I am aware that it is not new to mix pulverized ore with common salt and subject them to the pressure of steam. I am also aware that it is not new to treat refractory ores of silver by boiling them in a solution of common salt and hydrochloric acid in the presence of free chlorine gas; and I am furthermore aware that it is not new to dissolve the gold in the form of chloride by treating the ore with hypochlorite of lime and hydrochloric acid, then removing the excess of chlorine by steam, and precipitating the gold by sulphurous acid; wherefore I disclaim such features.

Having thus fully described my invention, I hereby disclaim all the well-known processes, chemical and mechanical, which enter into said description; and

I claim—

1. The process of chlorinating ores, which consists in charging the ore with chlorine under a pressure greater than that of the atmosphere, whereby the union of the chlorine with the metal of the ore is facilitated, substantially as set forth.

2. The process of chlorinating ores, which consists in charging the ore with chlorine under a pressure greater than that of the atmosphere, such pressure being produced by the evolution of chlorine gas within a closed chamber containing the ore, substantially as described.

3. The process of chlorinating ores, which consists in charging the ore with chlorine under a pressure greater than that of the atmosphere, and keeping the contents of the vessel in agitation during the process of chlorination, substantially as described.

J. HOWELL MEARS.

Witnesses:
MARCUS S. HOPKINS,
E. C. DAVIDSON.